No. 837,945. PATENTED DEC. 11, 1906.
C. C. MOFFET.
NUT LOCK.
APPLICATION FILED JUNE 25, 1906.
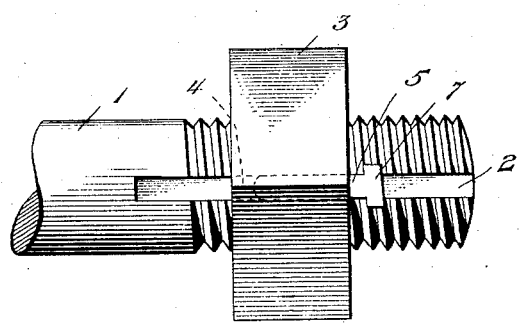
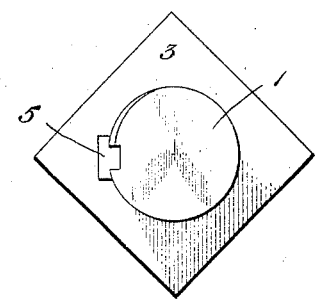
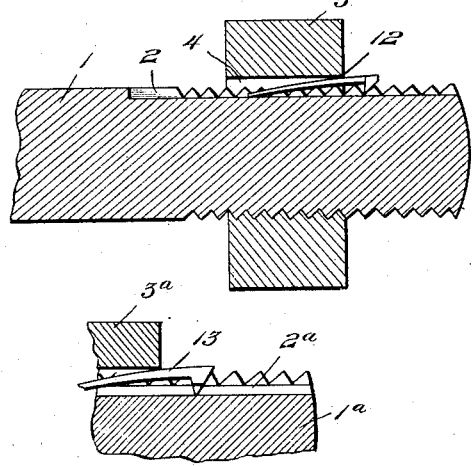
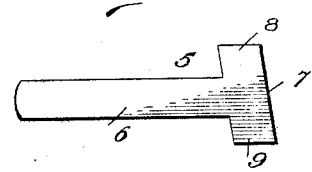
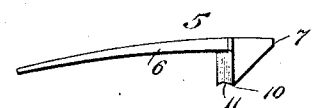
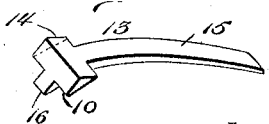
Inventor
Carmelous C. Moffet
Witnesses
By Edwin E. Vrooman
his Attorney

UNITED STATES PATENT OFFICE.

CARMELOUS C. MOFFET, OF BARNEY, NORTH DAKOTA.

NUT-LOCK.

No. 837,945.  Specification of Letters Patent.  Patented Dec. 11, 1906.

Application filed June 25, 1906. Serial No. 323,372.

*To all whom it may concern:*

Be it known that I, CARMELOUS C. MOFFET, a citizen of the United States, residing at Barney, in the county of Richland and State of North Dakota, have invented certain new and useful Improvements in Nut-Locks, of which the following is a specification, reference being had therein to the accompanying drawings.

This invention relates to improvements in nut-locks, and particularly to the construction of a spring-key.

The object of the invention is the provision of means for facilitating the locking of a nut upon a bolt.

With this and other objects in view the invention consists of certain novel constructions, combinations, and arrangements of parts, as will be hereinafter fully described, illustrated in the accompanying drawings, and more particularly pointed out in the claims hereto appended.

In the drawings, Figure 1 is a view in side elevation of the threaded end of a bolt carrying a nut and showing my improved means for locking said nut upon said bolt. Fig. 2 is an end view of the structure depicted in Fig. 1. Fig. 3 is a longitudinal sectional view of the structure depicted in Fig. 1. Fig. 4 is a top plan view of the spring-key, while Fig. 5 is a side view thereof. Fig. 6 is a perspective view of another embodiment of the spring-key. Fig. 7 is a fragmentary view of a bolt and nut, showing the key depicted in Fig. 6 in position thereon for locking the nut upon the bolt.

Referring to the drawings, 1 designates a bolt provided with a threaded end, having a longitudinally-extending groove 2 formed therein. A nut 3 is threaded upon bolt 1. The nut 3 is provided with a slot 4. The slot 4 is of the same width as the groove 2.

A peculiarly-constructed spring-key 5 is employed for locking the nut 3 upon the bolt 1. The spring-key 5 is formed of a piece of resilient material, and said key comprises an inwardly curved or bowed spring-shank 6, provided with an integral head 7. The head 7 comprises laterally-extending portions 8 and 9, more clearly illustrated in the enlarged view of the key depicted in Fig. 4. The portion 8 is formed at an acute angle to the shank or body 6 of the key, and the portion 9 is formed at an obtuse angle to the shank 6. It will therefore be seen that the head 7 is formed at an oblique angle for producing a highly efficient structure. By reason of forming the head at an oblique angle to the shank 6 said head will rest snugly in a groove formed by any two contiguous threads of the bolt 1. As the threads of a bolt are not formed around the periphery thereof at right angles, but are of necessity at an oblique angle, by reason of forming my head at an oblique angle the head of the key will be seated snugly within a groove of the bolt formed by contiguous threads, although it may be quickly lifted out of the groove when it is desired to remove the key 6 and nut 3.

The head 7 is substantially wedge-shaped or tapers from its upper portion downward to a point 10, Fig. 5. The tapered structure of the head conforms to the walls of two contiguous threads of the bolt 1, while the lower pointed end 10 is slightly inwardly curved, as at 11, so that the head may be more snugly seated within a groove formed by two threads on the bolt 1, for it is obvious that the periphery of a bolt is not flat but rounded. Therefore I have produced a highly efficient structure by the tapered head and inwardly-curved pointed end, which structure accommodates said head to the periphery of the bolt.

To lock the nut 3 upon bolt 1, the spring-shank 6 is slid into the groove 2 of the bolt 1, and as the shank comes in contact with the bottom 12 of the grooved portion 4 of the nut 3 pressure is exerted upon the spring-shank as the key is forced inward, causing the head to ride over the threads of the bolt. When pressure is removed from the head, the same will be seated within a groove formed between two contiguous threads, and by reason of the inner end of the bowed shank being seated within the groove 2 and the head between the threads the nut will be securely retained upon the bolt.

In Fig. 7 the bolt 1ᵃ is provided with a deeper groove 2ᵃ than bolt 1. The nut 3ᵃ, however, is similarly constructed to nut 3. The spring-key 13 is similarly constructed to key 5 with the exception of some modifications, as will be hereinafter mentioned. The head 14 of key 13 is arranged at an oblique angle to the shank 15, and the head 14 tapers downward to a point 10. An integral depending lug 16 is formed upon head 14, and said lug 16 tapers from its upper end to a point at its lower end. While the head 14 is seated within a groove formed between two contiguous threads of bolt 1ᵃ, the lug 16 is seated within the lower portion of groove 2ª of bolt 1ª. The tapered structure of lug 16 forming the pointed end permits the head to slightly bite or grip the bottom of groove 2ª, and thereby materially assist in producing a rigid lock for preventing any movement of the nut 3ª upon the bolt 1ª when the key is in a locked position.

It will be obvious that the heads of the key depicted in Figs. 4 and 6 are of greater width than the shank of the spring-metal key by reason of the angular positioning of the head relative to the shank.

By reason of the peculiar structure of the head of the key depicted in Fig. 6 said key securely locks the nut in an adjusted position upon the bolt, for the body of the head, lugs 16, and the outer end of the shank 15 all perform an important function in securing the nut 3 upon the bolt.

What I claim is—

1. In a nut-lock, the combination with a bolt, provided with an elongated groove, a nut provided with a slot, threaded upon the grooved end of said bolt, of a spring-key seated within the groove of said bolt and slot of said nut, said key comprising a resilient shank inwardly bowed throughout its entire length and an integral head formed at an oblique angle to said shank.

2. The combination with a grooved bolt and a slotted nut, said nut threaded upon said bolt and having its slot register with the groove of the same, of a spring-key positioned within the slot of said nut and groove of said bolt, said key comprising a resilient shank and an integral head, the head formed at an oblique angle to said shank, and said head tapering from its upper portion to a point at its lower portion.

3. The combination with a grooved bolt and a slotted nut, the nut threaded upon said bolt and having its slot registering with the groove thereof, of a key positioned within the slot of said nut and groove of said bolt, said key provided with a resilient shank inwardly bowed throughout its entire length and with an integral head, said head formed at an oblique angle to said shank, said head tapering from its upper end to its lower end, and an integral lug extending from the lower end of and of less dimensions than said head.

4. The combination with a grooved bolt and a slotted nut, said nut threaded upon said bolt and having its slot registering with the groove, of a key positioned within the slot of said nut and the groove of said bolt, said key comprising a resilient shank inwardly bowed throughout its entire length, an integral head formed upon one end of said shank, said head tapering downward to a point, and a tapering lug of less length than and formed integral with said head.

5. The combination with a bolt and a nut, of a key for locking said nut upon said bolt, said key comprising a spring-shank inwardly bowed throughout its entire length, a head integral with said shank, said head tapering from a broad, flat upper portion to a lower, sharp point, and a tapering lug provided with a sharp, lower edge formed integral with said head.

In testimony whereof I hereunto affix my signature in presence of two witnesses.

CARMELOUS C. MOFFET.

Witnesses:
 R. N. INK,
 GEO. E. WALLACE